(12) United States Patent
Ishio et al.

(10) Patent No.: US 7,927,725 B2  
(45) Date of Patent: Apr. 19, 2011

(54) MAGNETIC RECORDING MEDIUM, PRODUCTION METHOD THEREOF AND MAGNETIC DISC APPARATUS

(75) Inventors: Shunji Ishio, Akita (JP); Hitoshi Saito, Akita (JP); Takashi Hasegawa, Akita (JP); Iwao Okamoto, Higashine (JP); Naoya Yamamoto, Kawasaki (JP)

(73) Assignees: Showa Denko K.K., Tokyo (JP); National University Corporation Akita University, Akita (JP)

( * ) Notice: Subject to any disclaimer, the term of this patent is extended or adjusted under 35 U.S.C. 154(b) by 152 days.

(21) Appl. No.: 12/206,479

(22) Filed: Sep. 8, 2008

(65) Prior Publication Data
US 2009/0161254 A1 Jun. 25, 2009

(30) Foreign Application Priority Data
Dec. 21, 2007 (JP) .................... 2007-331113

(51) Int. Cl.
*G11B 5/66* (2006.01)

(52) U.S. Cl. ............................................... 428/836

(58) Field of Classification Search .................. None
See application file for complete search history.

(56) References Cited

U.S. PATENT DOCUMENTS

| 6,383,597 | B1 * | 5/2002 | Fullerton et al. ............ 428/836.1 |
| 2004/0191557 | A1 * | 9/2004 | Kamata et al. ................. 428/611 |
| 2006/0177705 | A1 * | 8/2006 | Ahner et al. ................... 428/832 |
| 2007/0217075 | A1 | 9/2007 | Kamata et al. |
| 2007/0224339 | A1 | 9/2007 | Kamata et al. |

FOREIGN PATENT DOCUMENTS

| JP | A 2007-250091 | 9/2007 |
| JP | A 2007-257801 | 10/2007 |
| JP | A 2007-273067 | 10/2007 |

\* cited by examiner

*Primary Examiner* — Holly Rickman  
(74) *Attorney, Agent, or Firm* — Greer, Burns & Crain, Ltd.

(57) ABSTRACT

A magnetic recording medium for use in digital magnetic recording, which comprises a nonmagnetic substrate having deposited thereon a magnetic layer, wherein with respect to the in-plane direction, the magnetic recording layer comprises a plurality of ferromagnetic regions separated from each other by an antiferromagnetic region. A production method of the magnetic recording medium and a magnetic disc apparatus are also disclosed.

13 Claims, 17 Drawing Sheets

US 7,927,725 B2

MAGNETIC RECORDING MEDIUM, PRODUCTION METHOD THEREOF AND MAGNETIC DISC APPARATUS

CROSS-REFERENCE TO RELATED APPLICATIONS

This application is based upon and claims a priority of Japanese Patent Application No. 2007-331113, filed on Dec. 21, 2007, the contents being incorporated herein by reference.

BACKGROUND OF THE INVENTION

1. Field of the Invention

The present invention relates to a magnetic recording medium for use in digital magnetic recording, a production method thereof, and a magnetic disc apparatus. More specifically, the present invention relates to a magnetic recording medium which can increase the track density and enhance thermal stability in a discrete track medium or can increase the bit density and enhance thermal stability in a bit patterned medium, and a production method thereof. The present invention also relates to a magnetic disc apparatus having mounted therein this magnetic recording medium.

2. Description of the Related Art

In the magnetic recording field, in order to cope with high-density recording of a medium of a magnetic disc apparatus, meet the requirement for larger capacity than in conventional mediums and solve the problem of thermal fluctuation, a so-called patterned medium (also called "patterned media") is being applied. The patterned medium includes a discrete track medium (DTM) where recording tracks are separated with the intention of bringing about interference between tracks, and a bit patterned medium (BPM) where recording bits are separated with the intention of enhancing thermal stability.

Conventionally, in the production of a discrete track medium, a method of etching a magnetic recording layer to form a track (see, for example, Japanese Unexamined Patent Publication (Kokai) No. 2007-257801) or a method of performing ion implantation in a magnetic recording layer to weaken the magnetism in that portion, thereby forming a track (see, for example, Japanese Unexamined Patent Publication (Kokai) No. 2007-273067) is used. Also, in the production of a bit patterned medium, a method of etching a magnetic recording layer to separate a magnetic recording region corresponding to single-bit recording (see, for example, Japanese Unexamined Patent Publication (Kokai) No. 2007-250091) is used. The production methods of a medium described in these patent publications are specifically described below.

FIGS. 1A to 1F are cross-sectional views sequentially showing the method for producing a discrete track medium by etching described in JPP'801. First, as shown in FIG. 1A, a medium obtained by sequentially stacking a ferromagnetic recording layer 152, a protective layer 153 and a resist layer 154 on a glass substrate 151, and a stamper 171 having troughs and ridges in a reversal pattern of the desired magnetic pattern are prepared. Then, although not shown, the troughs and ridges of the stamper are pressed against the resist layer to transfer the trough-ridge pattern and through a series of steps such as etching and ion milling, a medium shown in FIG. 1B is produced. In the obtained medium, as shown, the portion corresponding to the trough part remains as a magnetic pattern of the ridge part.

Subsequently, as shown in FIG. 1C, carbon (C) as a first nonmagnetic material 155 is filled by sputtering to fill the trough part of the magnetic pattern. The first nonmagnetic material 155 is surface-modified and then, as shown in FIG. 1D, carbon (C) as a second nonmagnetic material 156 is film-formed by sputtering on the first non-magnetic material 155. Thereafter, ion milling is performed, whereby, as shown in FIG. 1E, the second nonmagnetic material 156 and the first nonmagnetic material 155 are etch-backed. Finally, carbon (C) is again deposited by a CVD method to form a protective layer 157 (see, FIG. 1F). When a lubricant is coated on the protective layer 157, an objective discrete track medium is obtained.

FIG. 2 is a cross-sectional view of the discrete track medium described in JPP'067. In this medium, as shown, a soft magnetic layer 202, a magnetic recording layer 203 and a protective layer 205 are sequentially stacked on a nonmagnetic substrate 201. The magnetic recording layer 203 after film formation is partially nonmagnetized by injecting an atom to have a nonmagnetized layer 204 together. Here, the width W of the magnetic recording layer 203 is preferably 200 nm or less, the width L of the nonmagnetized layer 204 is preferably 100 nm or less. Specifically, for example, the nonmagnetized layer can be formed by, after the formation of the protective layer is completed, coating a resist on a surface of the protective layer to selectively mask the underlying magnetic recording layer and implanting an atomic ion only in the exposed magnetic recording layer by using an ion beam or the like.

FIGS. 3A to 3E are cross-sectional views sequentially showing the method of producing a bit patterned medium by etching described in JPP'091. First, as shown in FIG. 3A, a medium obtained by sequentially stacking a ferromagnetic recording layer 352, a protective layer 353 and a resist layer 354 on a glass substrate 351, and a stamper 371 having formed thereon a trough pattern corresponding to a magnetic pattern are prepared. Then, although not shown, the trough part of the stamper is pressed against the resist layer to transfer the trough-ridge pattern and the resist residue remaining at the bottom of the trough part of the patterned resist layer is removed by etching. Thereafter, as shown in FIG. 3B, ion milling is performed using the remaining resist layer as a mask, whereby the ferromagnetic layer 352 is etched.

Subsequently, as shown in FIG. 3C, carbon (C) as a first nonmagnetic material 355 is formed as a film by sputtering to fill the trough part of the magnetic pattern. After filling of the trough part is completed, as shown in FIG. 3D, the nonmagnetic material 355 is ion-milled to etch-back the nonmagnetic material 355. Finally, carbon (C) is again deposited by a CVD method to form a protective layer 356 (see, FIG. 3E). When a lubricant is coated on the protective layer 356, an objective bit patterned medium is obtained.

These conventional patterned mediums have many points to be improved for more increasing the magnetic recording density. For example, in the discrete track medium, magnetic separation between adjacent tracks must be performed sharply, and in the bit patterned medium, magnetic separation between patterned magnetic bits needs to be improved.

Specifically, in the conventional technique of performing the patterning of the medium by etching as described above, because of indistinct boundary line of the track, the trough formed between adjacent tracks can be hardly formed in a sharp groove shape and there is a problem in coping with increase in the density. Also, a bump generated due to back filling of the trough prevents contact with, for example, a readout head such as GMR and TMR and therefore, the surface needs to be flattened by etch back. Furthermore, a step for etching or back filling is added to the process of forming a magnetic recording medium and this gives rise to a problem of rise in the production cost.

On the other hand, in the conventional method by ion implantation, a CoCr-based alloy is used in the magnetic recording layer and therefore, ion implantation of a large amount of a nonmagnetic element is required to weaken the magnetism of the implanted region, which causes a problem that the surface property of the medium deteriorates or the production efficiency decreases. Also, since the amount of ion implanted in the ion implantation region is fairly large, a trouble of bumping of the regional portion arises. Particularly, in the method by ion implantation, the volume of a bit is made small to cope with increase in the density, but the magnetic energy decreases in proportion and there arises a problem that the magnetism disappears due to a thermal fluctuation phenomenon. In order to solve this problem, a material having high magnetic anisotropy is used with an attempt to increase the magnetization energy, but the coercive force Hc becomes high and this brings about a new problem that writing through the head cannot be performed. A so-called thermal assist recording method (the medium is heated only at writing, whereby Hc is decreased) has been proposed to solve such a problem, but the head structure is complicated and this method is not recommendable.

SUMMARY OF THE INVENTION

The present invention has been made to solve the above problems in conventional techniques and an object of the present invention is to realize the production of a patterned medium where in utilizing etching, a sharp groove in the nanometer order can be formed or in utilizing ion implantation, the ferromagnetism in the ion implantation region can be sharply attenuated to increase the density by the miniaturization of a bit.

More specifically, an object of the present invention is to provide a patterned medium ensuring that the boundary between a ferromagnetic region and an antiferromagnetic region is narrow, the change from ferromagnetism to antiferromagnetism or the change from antiferromagnetism to ferromagnetism is sharp, the density can be easily increased and adjusted, magnetic separation between magnetic bits can be definitely established, deterioration of the surface property can be suppressed, the medium can contribute to stable floating of a magnetic head in several nanometer order, and enhancement in terms of the production cost and productivity can be achieved, and a production method thereof.

Another object of the present invention is to provide a magnetic disc apparatus equipped with the above patterned medium.

These and other objects of the present invention will be easily understood from the following detailed description.

The present inventors have found that when a material made to cause no change in the crystal structure and undergo a sharp change in the physical properties from ferromagnetism to antiferromagnetism or from antiferromagnetism to ferromagnetism by adjusting the composition is used as the magnetic recording medium, the above-described objects can be attained and further that ion implantation, diffusion of an atom, that is, an additive element, and the like are effective as means for changing the composition of the material, and completed the present invention.

In one aspect, the present invention resides in a magnetic recording medium, that is, a patterned medium, comprising a nonmagnetic substrate having deposited thereon a magnetic recording layer, wherein with respect to the in-plane direction, the magnetic recording layer comprises a plurality of ferromagnetic regions separated from each other by an antiferromagnetic region.

In the patterned medium of the present invention, the magnetic recording layer deposited on a nonmagnetic substrate may contain a plurality of recording track regions extending in the circumferential direction, each composed of a plurality of continuous or isolated bits and formed of a ferromagnetic material, and a track-to-track separation region located between the recording track regions adjacent to each other and formed of an antiferromagnetic material.

The patterned medium of the present invention may be provided in various forms. For example, in one preferred embodiment, the medium of the present invention is a discrete tack medium where each recording track region of the magnetic recording layer is a track composed of a plurality of recording bits concentrically and continuously extending without break in the circumferential direction. Hereinafter, this medium is sometimes referred to as "DTM".

In another embodiment, the medium of the present invention is a bit patterned medium where each recording track region of the magnetic recording layer is a sequence composed of a plurality of recording bits concentrically arrayed along the circumferential direction in a mutually divided state. In the case of this medium, in addition to the track-to-track separation region, the region between before and after recording bits in each recording bit sequence is also formed of an antiferromagnetic material. Hereinafter, this medium is sometimes referred to as "BPM".

In the magnetic recording medium of the present invention, the ferromagnetic material and the antiferromagnetic region preferably have the same crystal structure, and the crystal structure is preferably an L1o crystal structure. For example, it is preferred that the ferromagnetic region and the antiferromagnetic region each comprises an FePtRh alloy as the main component and are differing from each other in the composition of the FePtRh alloy. Also, the (001) axis of the L1o crystal structure is preferably oriented perpendicularly to the formed base body to allow the medium to have perpendicular magnetic anisotropy attributable to the orientation.

In another aspect, the present invention resides in a method for producing the magnetic recording medium of the present invention. The method of the present invention comprises the step of depositing a magnetic recording layer on a nonmagnetic substrate, and modifying a predetermined region of the magnetic recording layer to form a ferromagnetic region and an antiferromagnetic region.

In practicing the method of the present invention, for example, after a material for forming either one of the ferromagnetic region and the antiferromagnetic region is formed as a film on the substrate, a predetermined region of the formed layer may be modified into another region. This method may be practiced by, for example, after a ferromagnetic material is film-formed on the substrate to a predetermined identical thickness, partially forming a mask on the ferromagnetic material layer and modifying the exposed region to become antiferromagnetic. The modifying step may be practiced, for example, by ion implantation or atomic diffusion.

In still another aspect, the present invention resides in a magnetic disc apparatus having mounted therein:

a magnetic recording medium having a magnetic recording layer on a nonmagnetic substrate, the magnetic recording layer containing a plurality of ferromagnetic regions separated by an antiferromagnetic material, a spindle motor for rotating the magnetic recording medium, and a head for recording or reproducing information on or from the magnetic recording medium. The head for use in this magnetic disc apparatus is preferably a magnetoresistive effect-type head, that is, an MR head, or other head such as AMR head, GMR head, spin bulb GMR head or TMR head.

DESCRIPTION OF THE PREFERRED EMBODIMENTS

Preferred embodiments of the present invention are described below by referring to the attached drawings. In the following, a discrete track medium is recited as the medium and an embodiment of implanting or diffusing rhodium (Rh) in an FePt-based alloy for forming a magnetic recording layer is recited, but the present invention is not limited to these embodiments.

The magnetic recording medium of the present invention is used in digital magnetic recording and as described above, the magnetic recording layer deposited on a nonmagnetic substrate contains a plurality of recording track regions extending in the circumferential direction, each composed of a plurality of continuous or isolated bits and formed of a ferromagnetic material, and a track-to-track separation region located between the recording track regions adjacent to each other and formed of an antiferromagnetic material.

Figure 1A:
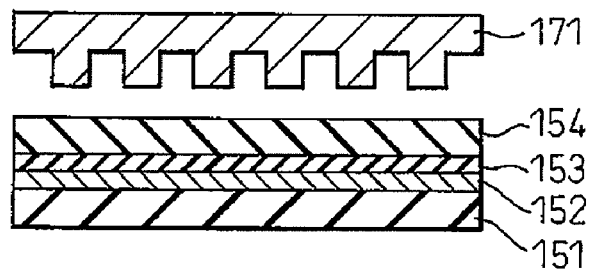
FIGS. 1A to 1F are cross-sectional views which sequentially show the production method of the patterned medium described in Japanese Unexamined Patent Publication (Kokai) No. 2007-257801.
Figure 1B:
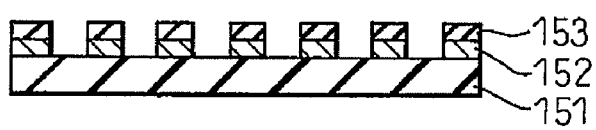
Figure 1C:
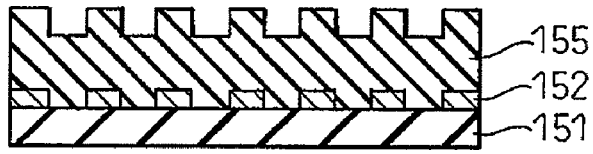
Figure 1D:
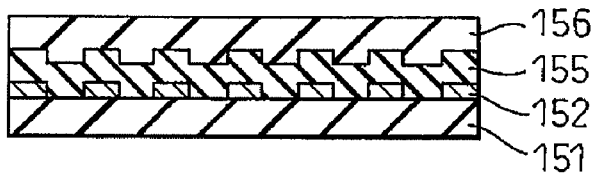
Figure 1E:
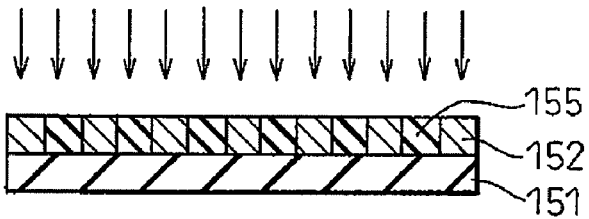
Figure 1F:
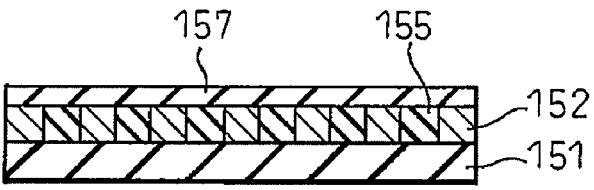
Figure 2:
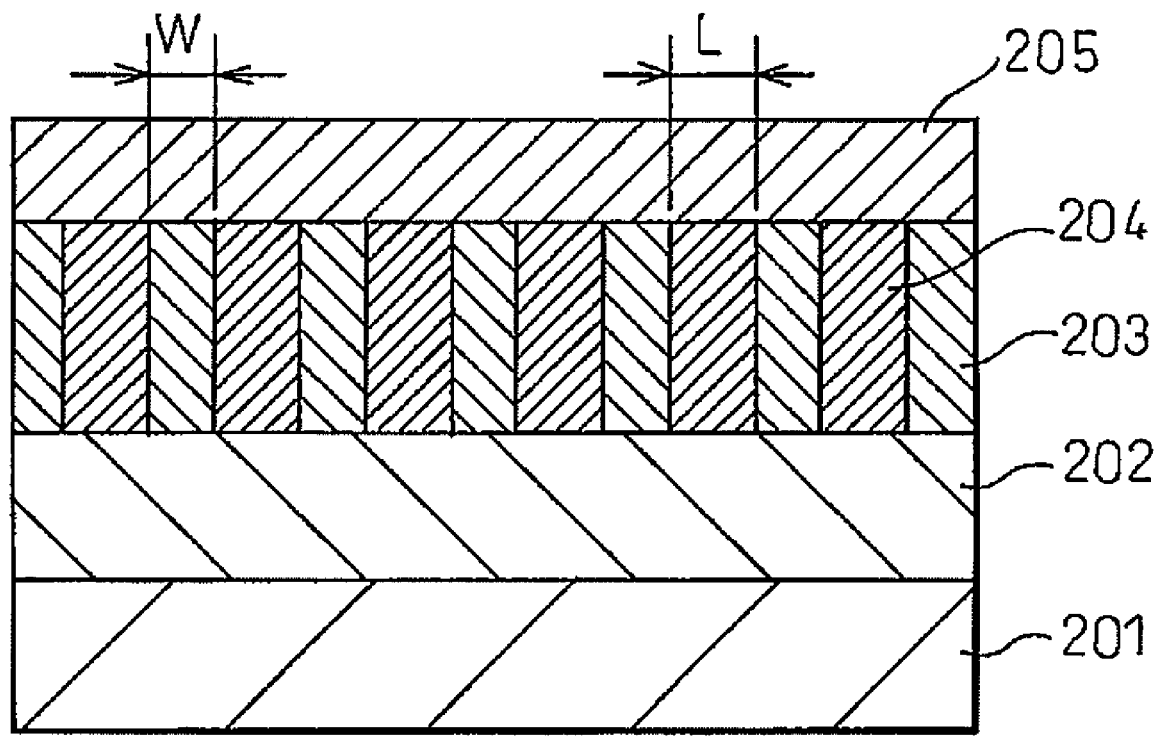
FIG. 2 is a cross-sectional view schematically showing the magnetic recording medium described in Japanese Unexamined Patent Publication (Kokai) No. 2007-273067.
Figure 3A:
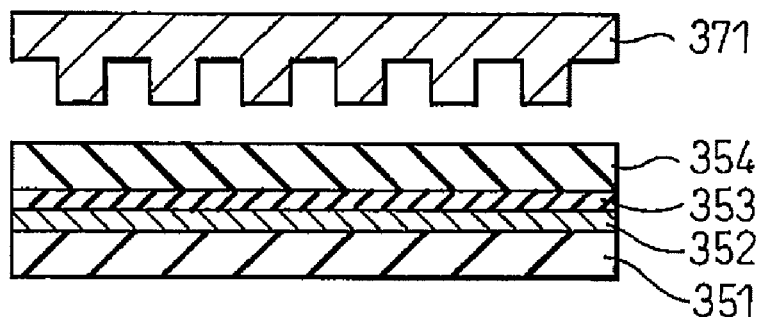
FIGS. 3A to 3E are cross-sectional views which sequentially show the production method of the patterned medium described in Japanese Unexamined Patent Publication (Kokai) No. 2007-250091.
Figure 3B:
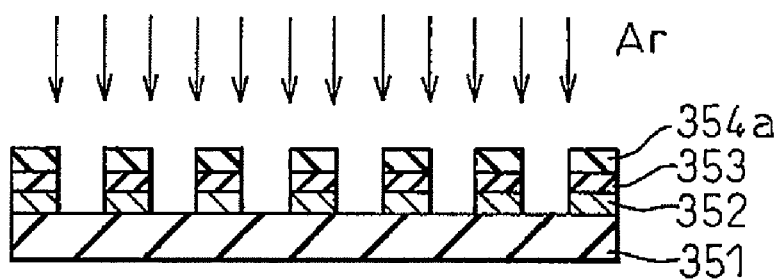
Figure 3C:
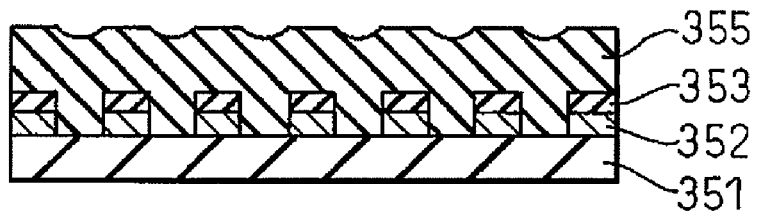
Figure 3D:
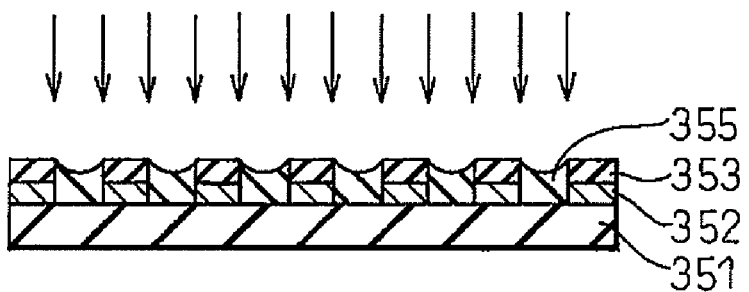
Figure 3E:
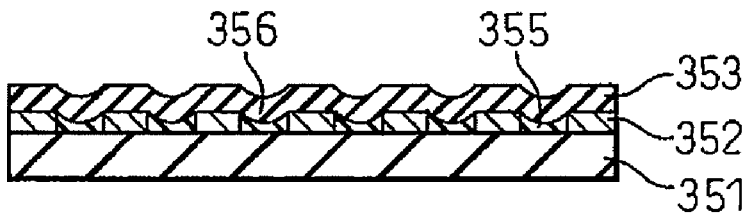
Figure 4A:
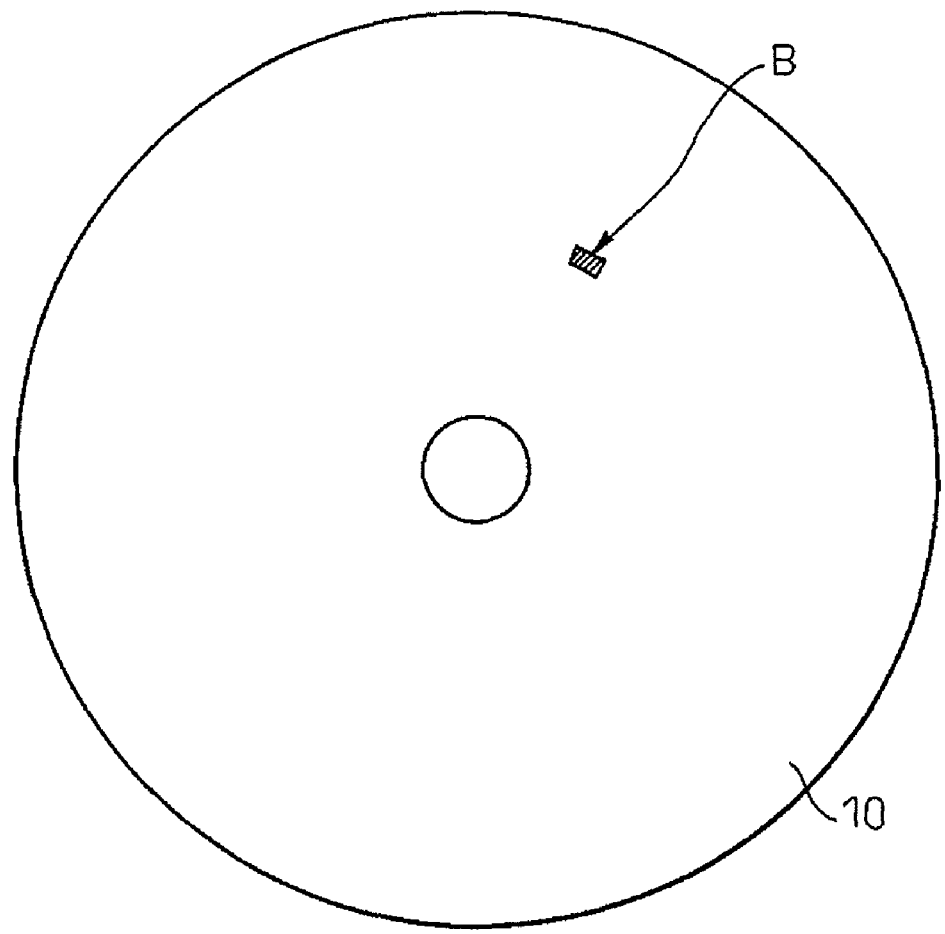
FIGS. 4A and 4B are a plan view and a partial enlarged view, showing the magnetic disc according to the present invention, respectively.
Figure 4B:
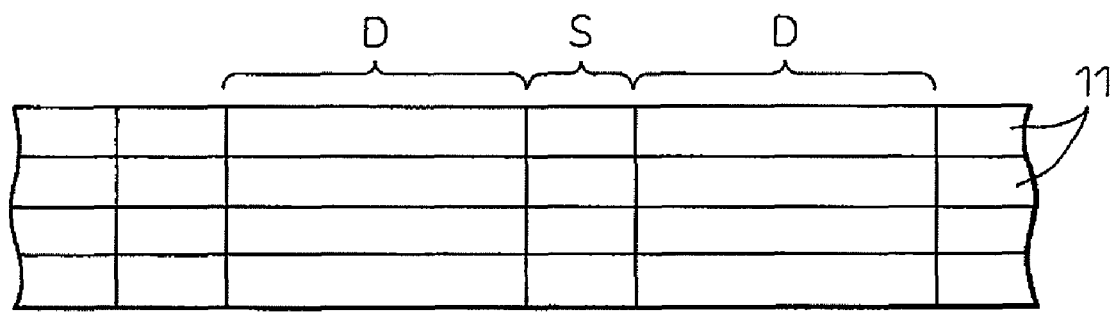

FIGS. 4A and 4B show a magnetic disk as a typical example of the magnetic recording medium of the present invention. The magnetic disc 10 is, as shown in FIG. 4A, a perfectly circular medium, and a plurality of recording tacks (not shown) in a predetermined pattern are formed on the surface like circumferences. As understood from FIG. 4B showing the region B of FIG. 4A in an enlarged manner, the recording track is formed such that a plurality of recording tracks 11 come adjacent each other. In each recording track 11, a servo region S for the positioning of a recording/reproducing head and a data region D for recording data are alternately formed. The servo region S contains a preamble part, an address part and a burst part, though not shown, and the data region D contains a "recording track region" as referred to in the present invention and a "track-to-track separation region" intervening between adjacent recording track regions. The recording track region is, when the medium is a discrete track medium (DTM), a track where a plurality of recording bits are continuously formed without break, that is, a so-called discrete track, and when the medium is a bit patterned medium (BPM), a track where a plurality of recording bits are formed in isolation from each other and arrayed like a sequence, a so-called bit pattern sequence.

Figure 5A:
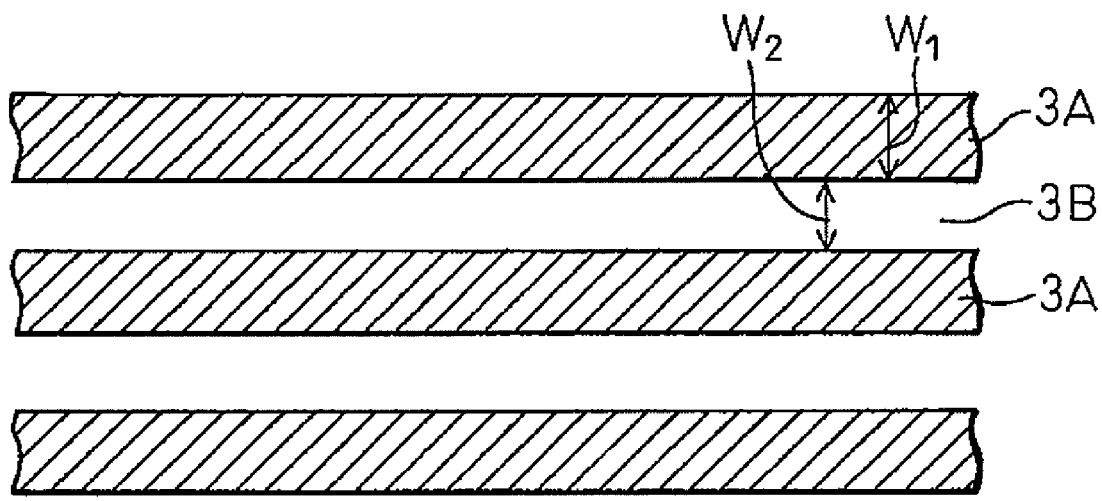
FIGS. 5A and 5B are schematic views showing a discrete track pattern and a bit pattern of the recording track region of the magnetic disc shown in FIGS. 4A and 4B, respectively.
Figure 5B:
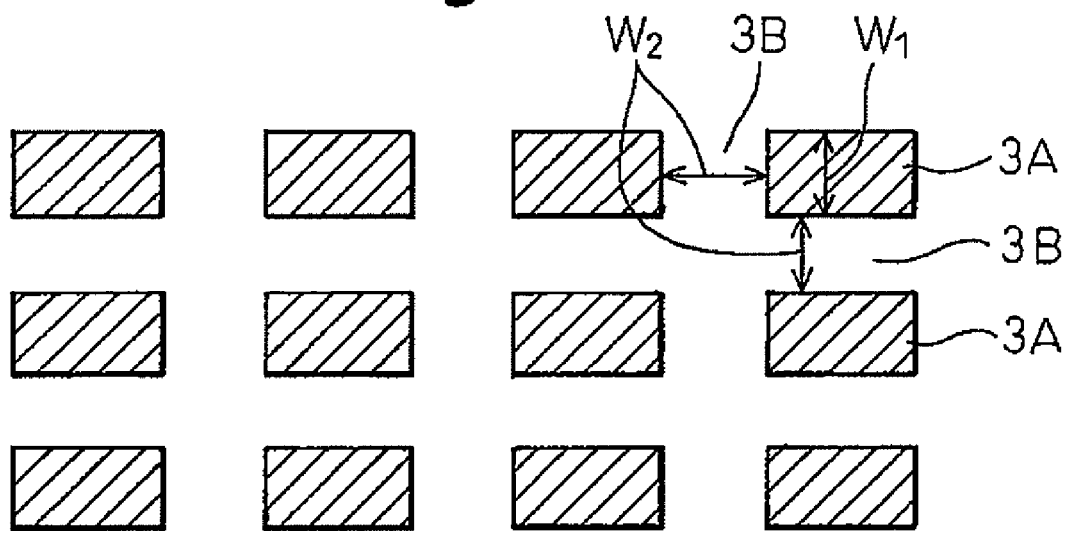

FIGS. 5A and 5B are a view for explaining the relationship between the recording track region and the track-to-track separation region in each recording track. FIG. 5A is an example of the recording track region in a discrete track medium. As shown, the recording track region is composed of a track 3A where a plurality of recording bits are continuously and unidirectionally formed without break and is a ferromagnetic region formed of a ferromagnetic material. The region present between adjacent tracks 3A is a track-to-track separation region 3B and is an antiferromagnetic region formed of an antiferromagnetic material. The ferromagnetic region may be formed of, for example, an FePt-based alloy to a width ($W_1$) of about 5 to 15 nm and a thickness of about 5 to 15 nm. The antiferromagnetic region adjacent to the ferromagnetic region may be formed, for example, when the ferromagnetic region is formed of an FePt-based alloy, by implanting rhodium (Rh) or diffusing Rh in the alloy. The width ($W_2$) of the antiferromagnetic region sandwiched by ferromagnetic regions is usually from about 5 to 15 nm. The thickness of the antiferromagnetic region is the same as the thickness of the ferromagnetic region and is usually from about 5 to 15 nm. Incidentally, in the following, the present invention is described particularly by referring to an example of the discrete track medium, but it should be understood that in the present invention, a bit patterned medium can be formed in the same manner and comparable results can be achieved.

FIG. 5B is an example of the recording track region in a bit patterned medium. As shown, the recording track region is composed of a track where a plurality of recording bits 3A are unidirectionally formed in isolation and not continuing unlike the discrete track medium (bit pattern sequence). This region is a ferromagnetic region formed of a ferromagnetic material. Also, the region present between adjacent recording bits 3A is a track-to-track or bit-to-bit separation region 3B and is an antiferromagnetic region formed of an antiferromagnetic material. The ferromagnetic region can be formed of, for example, an FePt-based alloy to a width ($W_1$) of about 5 to 15 nm and a thickness of about 5 to 15 nm. The antiferromagnetic region adjacent to the ferromagnetic region may be formed, for example, when the ferromagnetic region is formed of an FePt-based alloy, by implanting rhodium (Rh) or diffusing Rh in the alloy. The width ($W_2$) of the antiferromagnetic region sandwiched by adjacent ferromagnetic regions is usually from about 5 to 15 nm. The thickness of the antiferromagnetic region is the same as the thickness of the ferromagnetic region and is usually from about 5 to 15 nm.

In the above-described patterned medium, the recording track region (ferromagnetic region) and track-to-track or bit-to-bit separation region (antiferromagnetic region) constituting the magnetic layer each may be formed of an arbitrary material, but these regions are preferably constructed such that the ferromagnetic material constituting the ferromagnetic region and the antiferromagnetic material constituting the antiferromagnetic region have the same crystal structure. Furthermore, the crystal structure is preferably an L1o crystal structure.

It is preferred that the ferromagnetic material and the antiferromagnetic material each comprises an FePtRh alloy as the main component and the composition of the FePtRh alloy differs between the recording track region and the track-to-track or bit-to-bit separation region. Specifically, as described above, the composition of the FePtRh alloy can be suitably changed by controlling the implantation or diffusion of Rh.

In the magnetic recording medium of the present invention, it is also preferred that the crystal structure is an L1o crystal structure as described above and the (001) axis of the L1o crystal structure is oriented perpendicularly to the formed base body to allow the medium to have perpendicular magnetic anisotropy attributable to the orientation.

Such a patterned medium can be usually formed by forming a precursor of a magnetic recording layer from a ferromagnetic material suitable for forming a recording track region on the entire medium, and then selectively modifying a portion where an antiferromagnetic region should be formed, thereby forming an antiferromagnetic region. By employing such a process, the patterned medium of the present invention where a ferromagnetic region and an antiferromagnetic region are alternately present, can be provided. In another method, a patterned medium may be provided by applying a process opposite thereto. That is, after forming a precursor of a magnetic recording layer from an antiferromagnetic material suitable for forming a track-to-track separation region on the entire medium, a portion where a ferromagnetic region should be formed may be selectively modified to form a ferromagnetic region. In the present invention, although not particularly described by referring to drawings, in each of the preamble part, address part and burst part of the servo region S, the part and a portion adjacent thereto may be formed as a ferromagnetic region and an antiferromagnetic region, similarly to the recording track region.

In the above, the magnetic recording layer and its construction in the patterned medium of the present invention were described. The construction of the magnetic recording layer used in the patterned medium of the present invention is described in more detail below.

In the field of a magnetic recording medium, there have been already made attempts to form the magnetic recording layer from an FePt-based alloy. For example, according to T. Suzuki and K. Ouchi, *IEEE Trans. Magn.*, 37, 1283 (2001), it is reported in FIG. 1 that high coercive force (Hc) which is a characteristic required of a magnetic recording medium is developed in an FePt-based alloy together with an L1o ordered alloy structure by applying a heat treatment of 600° C. to a film formed by sputtering. In the report by T. Suzuki et al., application of FePt as a recording medium is proposed, but for forming a groove between tracks or a nonmagnetic region by the compositional modulation in a patterned medium, a conventional etching method must be relied on and the problems described above in Background Art cannot be avoided.

Meanwhile, as regards the FePt-based material on which T. Suzuki et al. studied, there was also made a report about a bulk material instead of a film (see, Shinji Yuasa and Hidenori Miyajima, *Journal of the Applied Magnetics Society of Japan*, Vol. 21, No. 3, pp. 122-128 (1997)). In this paper by Yuasa et al., it is reported that by adding Rh to an FePt-based alloy, the magnetism steeply changes from ferromagnetism to antiferromagnetism while keeping the L1o crystal structure.

The present inventors have found here that since antiferromagnetism is equivalent to nonmagnetism in view of magnetic recording, when a portion corresponding to the nonmagnetic region of a conventional patterned medium can be constituted by antiferromagnetism of an FePtRh-based material through an ion implantation or diffusion phenomenon, a further increase in the magnetic recording density can be expected by virtue of the characteristic steep change of the magnetic property. In particular, present inventors have made intensive studies on an FePtRh alloy reported only as a bulk material, with an attempt to apply the alloy to a magnetic recording medium, as a result, it has been found that when a thin film of the FePtRh alloy is formed by a sputtering method generally employed for the mass production of a medium, this film allows for technical adaptation of its magnetic characteristics to a patterned medium, and completed the present invention. The best modes for carrying out the present invention are described below.

First, with an attempt to form an FePtRh medium thin film suitable as a magnetic recording layer, an FePtRh medium for use as a magnetic recording layer was formed on an $SiO_2$ substrate by a sputtering method in a multi-cathode construction using Fe, Pt, an FeRh alloy and $SiO_2$ as targets. The composition of the FePtRh alloy could be adjusted by changing the electric power charged into each cathode. Incidentally, heating of the substrate during sputtering was not performed. Furthermore, Ar was used as a process gas for sputtering discharge under the pressure condition of 0.5 Pa. Also, $SiO_2$ was added with the intention to improve the perpendicular orientation of c-axis with respect to the film surface in an L1o crystal structure. The improvement of orientation by the addition of $SiO_2$ is described in the publication by Sellmyer et al. (see, C. P. Luo, S. H. Liou, L. Gao, Y. Liu and D. J. Sellmyer, *Appl. Phys. Lett.*, 77, 14 (2000)). In this way, film formation by sputtering based on a multi-cathode construction was performed, as a result, the composition of the obtained film was $Fe_{50}(Pt_{1-x}Rh_x)_{50}$—$SiO_2$. In the formula, x represents the Rh compositional ratio to Pt and was varied in the range from 0 to 0.7. Here, $SiO_2$ is used for the purpose of imparting perpendicular orientation, and the orientation may be imparted by using other additives or an underlying layer.

Figure 6:
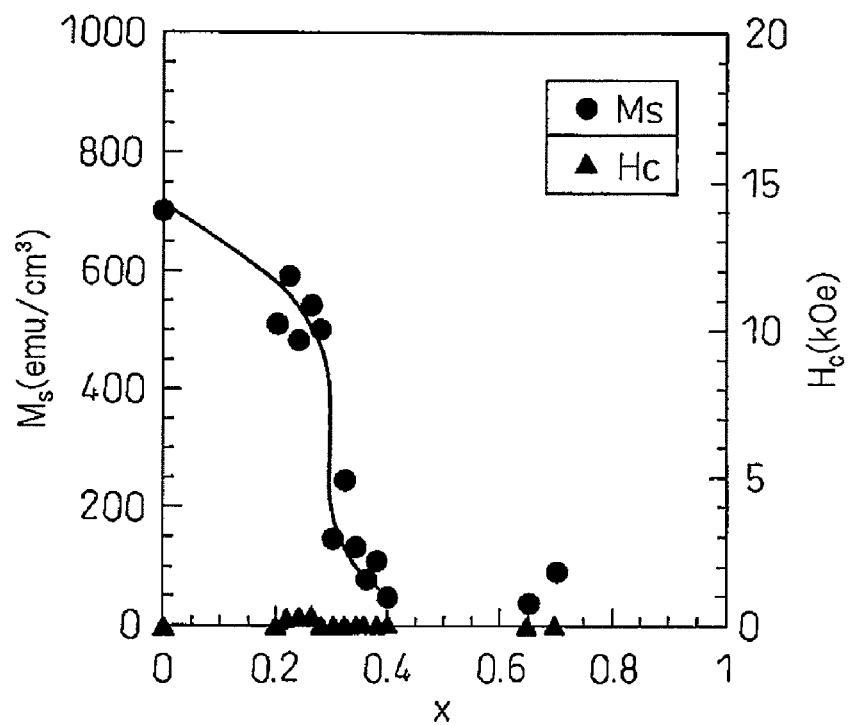
FIG. 6 is a graph plotting changes of saturated magnetization (Ms) and coercive force (Hc) when the compositional ratio x of Pt and Rh in the magnetic recording layer is varied.

FIG. 6 shows the changes in the saturated magnetization (Ms) and coercive force (Hc) when the compositional ratio x of Pt and Rh is varied in an $Fe_{50}(Pt_{1-x}Rh_x)_{50}$—$SiO_2$ medium. As understood from the Figure, Ms rapidly decreases in the vicinity of x=0.3, but even when x is further increased, Ms does not disappear and about 100 emu/cm³ remains. Also, Hc is scarcely generated over the entire compositional ratio region and in a magnetic disc apparatus generally requiring Hc of 3 kOe or more, the trial thin film shown in FIG. 6 cannot be applied.

Figure 7:
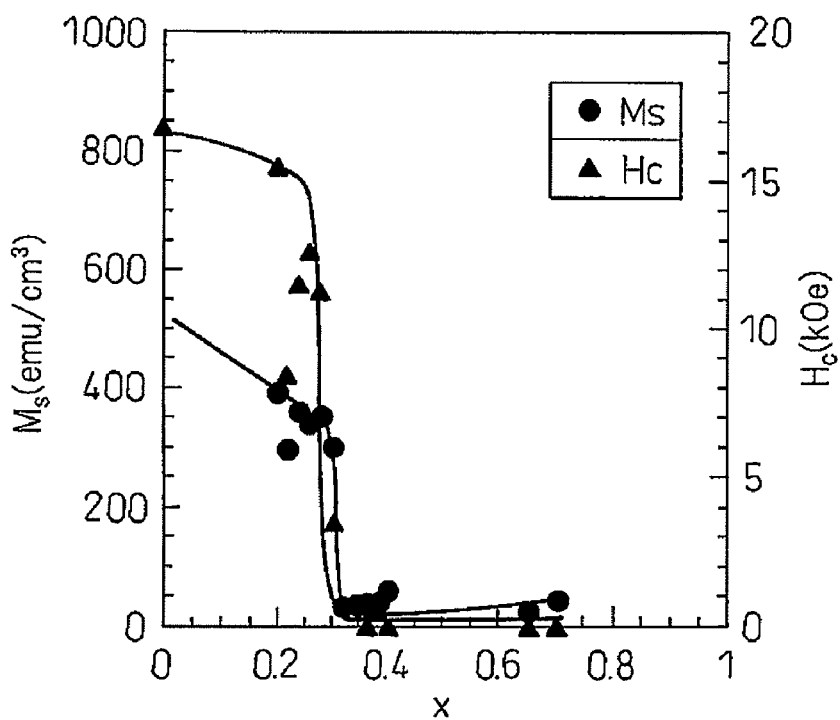
FIG. 7 is a graph plotting the results after a heat treatment at 700° C. for 2 hours in the magnetic recording layer shown in FIG. 6, FIGS. 8A to 8D each is a view of magnetization loops showing the change of the magnetic characteristics between before and after a heat treatment in the magnetic recording layer shown in FIGS. 6 and 7, FIGS. 9A and 9B each is a view of magnetization loops showing the results when analyzing the change of the crystal structure between before or after a heat treatment in the magnetic recording layer, respectively.

Next, the thin film shown in FIG. 6 was subjected to heating treatment at 700° C. for about 2 hours in a vacuum heat-treating furnace. FIG. 7 shows the results. Surprisingly, in the region of the Rh compositional ratio being from 0.2 to 0.7, particularly on reaching about x=0.3, a great change of saturated magnetization was observed.

Figure 8A:
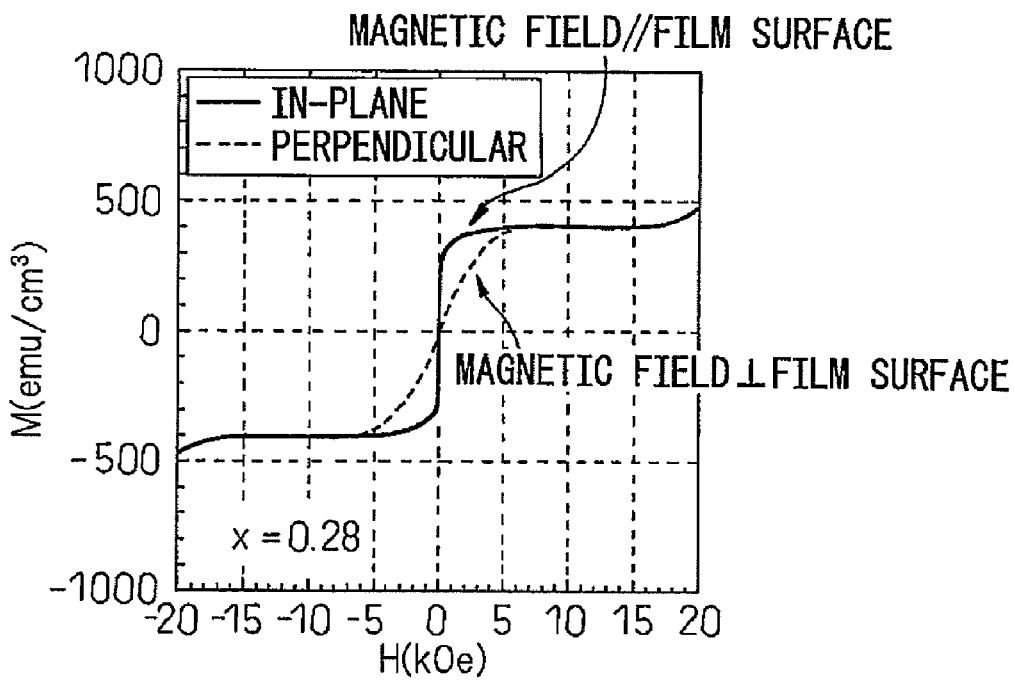
Figure 8B:
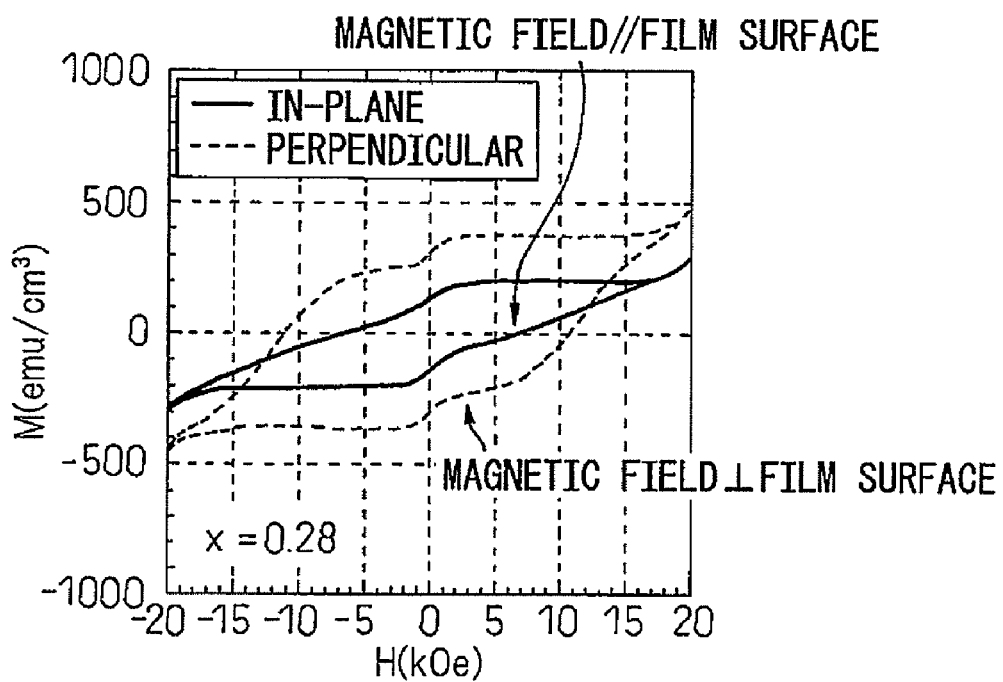

FIGS. 8A to 8D each is a graph showing magnetization loops of the thin films shown in FIGS. 6 and 7. The magnetization loops shown in FIGS. 8A to 8D each is plotting the magnetic characteristics measured using an alternating gradient magnetometer (AGM). Referring to FIG. 8A to FIG. 8D, in the thin film of x=0.28, FIG. 8A and FIG. 8B are magnetic characteristics before heat treatment and after heat treatment, respectively. With this composition, hysteresis of loop was not observed in the film before heat treatment, that is, immediately after film formation. In other words, soft magnetism was presented without expressing a large coercive force. On the other hand, in the state after heat treatment, Hc was abruptly increased and in the case of this composition, Hc measured while applying a magnetic field in the direction perpendicular to the film surface took a large value exceeding 10 kOe. Also, it is seen from FIG. 8B that the angular form of the hysteresis loop measured while applying a magnetic field in parallel to the film surface is flat as compared with the case of perpendicularly applying a magnetic field and a perpendicular magnetization film is formed.

In the case of a perpendicular medium practically used as a magnetic disc apparatus at present, Hc is generally adjusted to about 5 kOe. In order to ensure high recording density characteristics, in view of the principle of magnetic recording, high Hc needs to be adjusted in the range allowed by the writing capacity of a head and as seen from the hysteresis loop of FIG. 8B, this thin-film material has an ability of expressing high Hc and is found to have suitability as a high-density perpendicular recording medium.

Figure 8C:
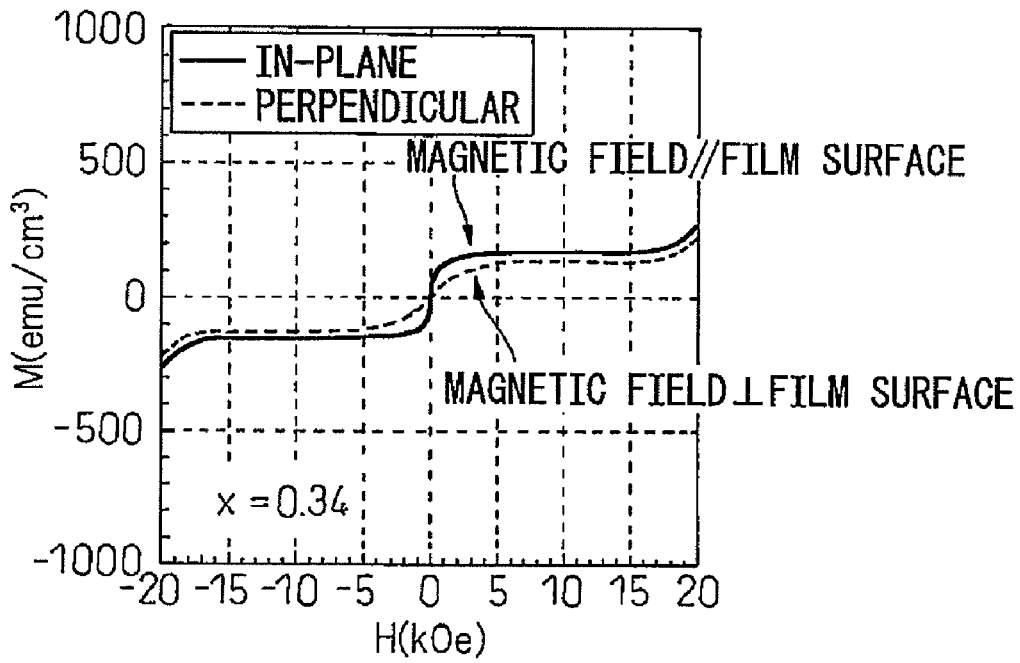
Figure 8D:
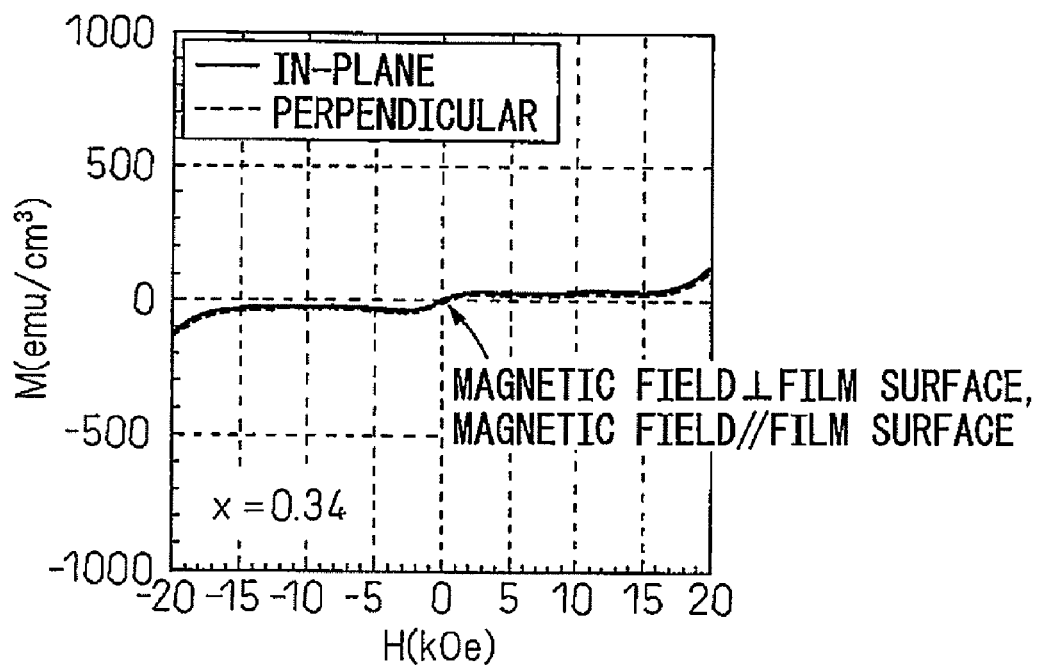

On the other hand, as for the film where the Rh concentration of the film shown in FIG. 8A and FIG. 8B is increased to x=0.34, FIG. 8C and FIG. 8D show the hysteresis loops before heat treatment and after heat treatment, respectively. In this case, in FIG. 8C, Ms of about 200 emu/cm³ and a soft magnetization process are observed. In FIG. 8D where this film is subjected to heat treatment, Ms seems to be decreased to about 20 emu/cm³. This small Ms corresponds to the background level of the alternating gradient magnetometer used for the measurement of the magnetization process and in this meaning, it is understood that the film shown in FIG. 8D almost lost the ferromagnetic characteristics. Incidentally, the increase of magnetization in the magnetic field region with the absolute value exceeding 15 kOe observed in FIGS. 8A to 8D is background characteristics of the alternating gradient magnetometer and is a phenomenon irrelevant to the substantial magnetism of the film.

Figure 9B:
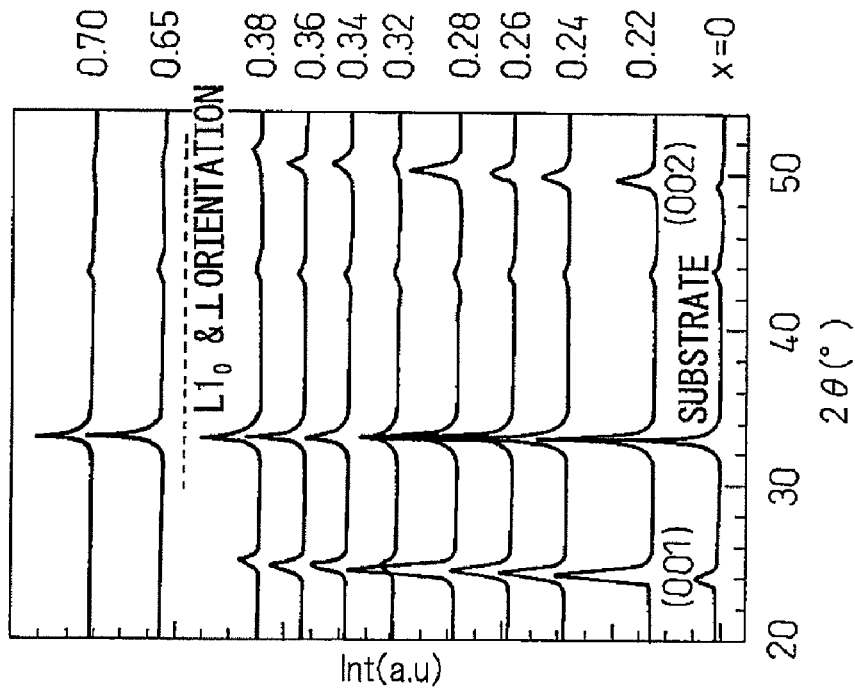
Figure 9A:
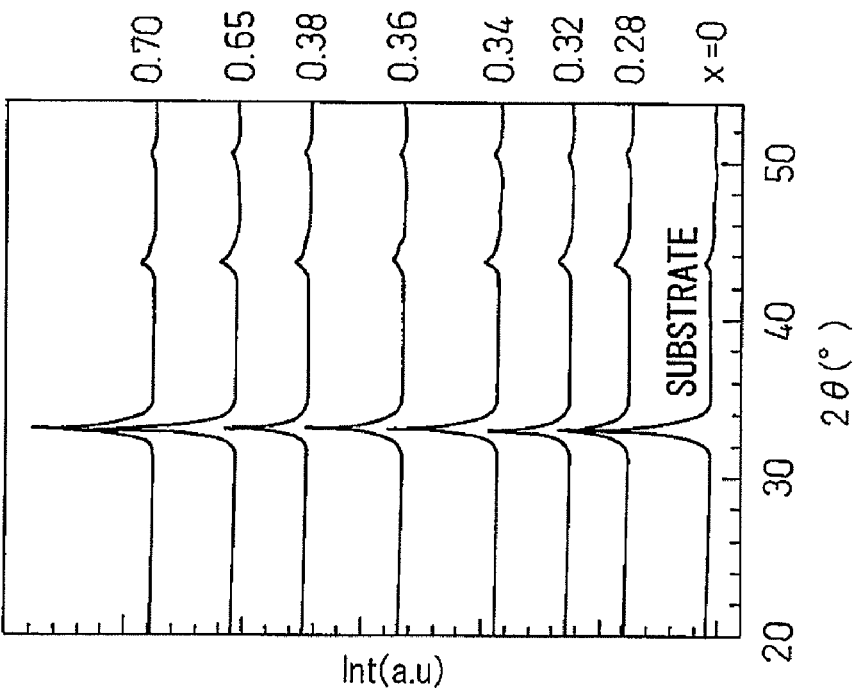

FIGS. 9A and 9B show the results when the change in the crystal structure between before and after heat treatment of the FePtRh film is analyzed by X-ray diffraction. FIG. 9A and FIG. 9B show the analysis results before and after heat treatment, respectively. The thickness of the film used for the analysis of the crystal structure was 10 nm.

First, in the X-ray diffraction before heat treatment shown in FIG. 9A, about three diffraction peaks are observed, but these diffraction peaks are a background signal of a substrate, a sample holder or the like and the structure of the film cannot be identified by this analysis. Accordingly, the structure identification of the film was separately performed by low-incident-angle X-ray diffraction. As a result, the crystal structure of the film was recognized as a face-centered cubic structure.

Next, the (001) reflection recognized in the X-ray diffraction results after heat treatment (see, FIG. 9B) is observed only when the thin film is in ordered lattice state. In addition to this (001), a significant reflection peak from (002) plane is recognized. These reveal that the film has an L1o structure. From these two experimental facts, the FePtRh film after heat treatment is understood to have an L1o structure. It is very difficult to identify that the magnetic structure of a very thin medium of 10 nm is antiferromagnetic, but considering the crystal structure analysis of a thin film in this study and the report in Shinji Yuasa and Hidenori Miyajima, *Journal of the Applied Magnetics Society of Japan*, Vol. 21, No. 3, pp. 122-128 (1997), it is understood that in the FePtRh alloy for use in the present invention, a steep change is generated in the saturated magnetization and coercive force due to transition of the magnetic property between ferromagnetism and antiferromagnetism in the L1o structure region.

Also, according to the low-incident-angle X-ray diffraction method, the presence of (111) place can be confirmed but (111) reflection which would be observed in the vicinity of 41° in the 2θ-θ method is scarcely observed, and this reveals good perpendicular orientation of c-axis of the L1o structure with respect to the film surface. Accordingly, the suitability of this thin film for a perpendicular magnetic recording medium can be judged as good.

In essence, in an $Fe_{50}(Pt_{1-x}Rh_x)_{50}$—$SiO_2$ medium of 10 nm in thickness, when a film composition of x=0.34 is realized by adding Rh to a selective region after a mask for forming an Rh discrete track medium or bit patterned medium is provided in the ferromagnetic region of x=0.28, the amount of Rh added necessary for antiferromagnetizing a portion corresponding to the nonmagnetic region of a conventional patterned medium is sufficient even if it is about 3 at %, and is excessively small. Therefore, it is considered that the surface property of the obtained medium is scarcely changed and patterning of the medium can be achieved by ion implantation in a short time (about several seconds), and an effect of reducing the cost or improving the mass productivity can be expected. Here, in place of ion implantation, diffusion of Rh atom or other means may also be employed. Also, as a matter of course, in the case of performing compositional modulation, it is possible to select a composition allowing the initial medium to be antiferromagnetic and form a ferromagnetic region by partially applying the compositional modulation.

Figure 10:
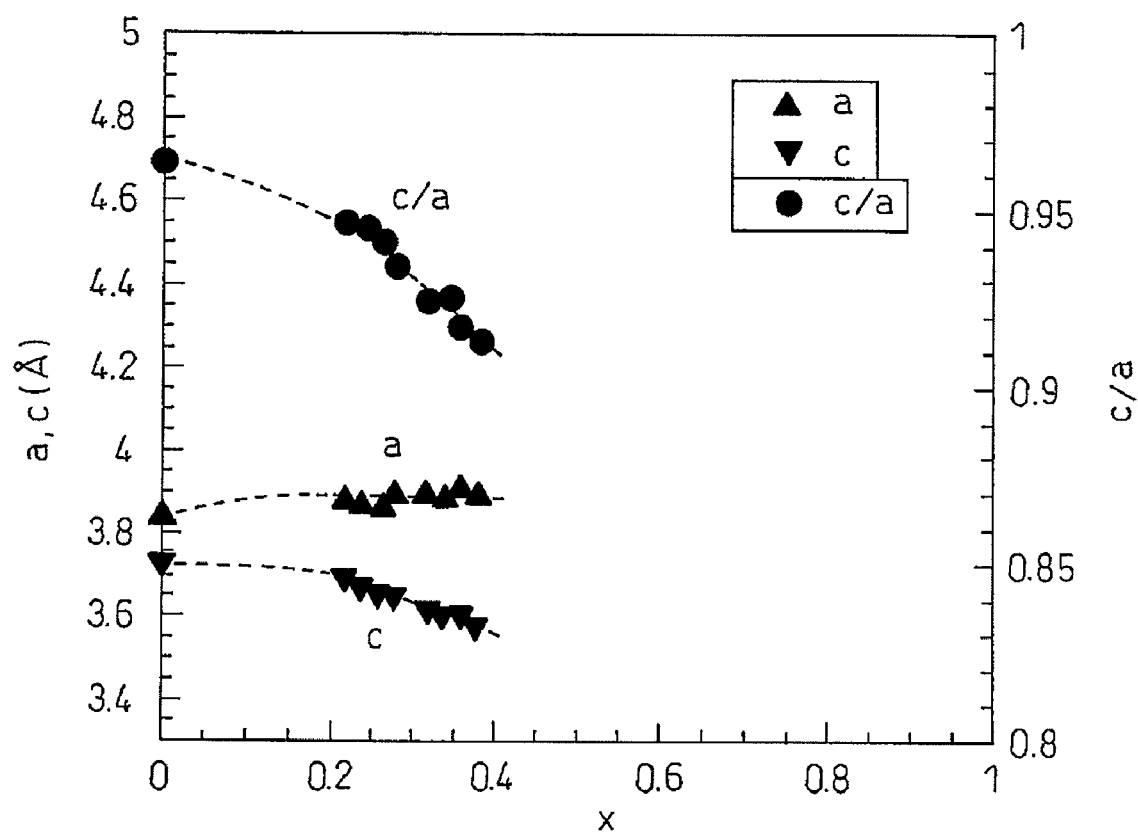
FIG. 10 is a graph plotting a and c lattice constants and c/a axial ratio with respect to the compositional ratio x of Pt and Rh in the magnetic recording layer shown in FIG. 7, FIGS. 11A and 11B each is a view of hysteresis loops showing the change of perpendicular magnetic orientation between before or after a heat treatment in the magnetic recording layer, respectively, FIGS. 12A and 12B each is a view of hysteresis loops showing the change of perpendicular magnetic orientation between before or after a heat treatment in the magnetic recording layer, respectively, FIGS. 13A and 13B each is a schematic view specifically explaining the mechanism of forming the antiferromagnetic region by a modification treatment such as ion implantation or atomic diffusion in the magnetic recording layer.

FIG. 10 shows the results together by plotting a lattice constant, c lattice constant and c/a axial ratio with respect to the ratio x of Rh added. In FIG. 7 described above, a very large change of saturated magnetization is recognized when x is between 0.28 and 0.34, but it is understood from FIG. 10 that in this region, a discontinuous change is not recognized in a, c and c/a and therefore, the volume change of the film is also gradual and small.

The results obtained when the magnetism of FePtRh is modulated mainly by the diffusion of Rh are described below.

Figure 11B:
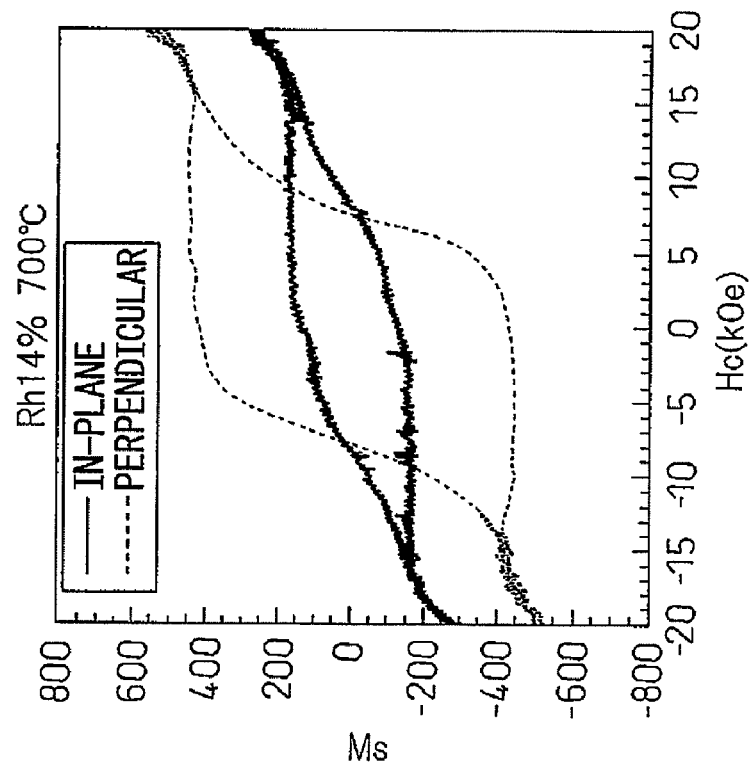
Figure 11A:
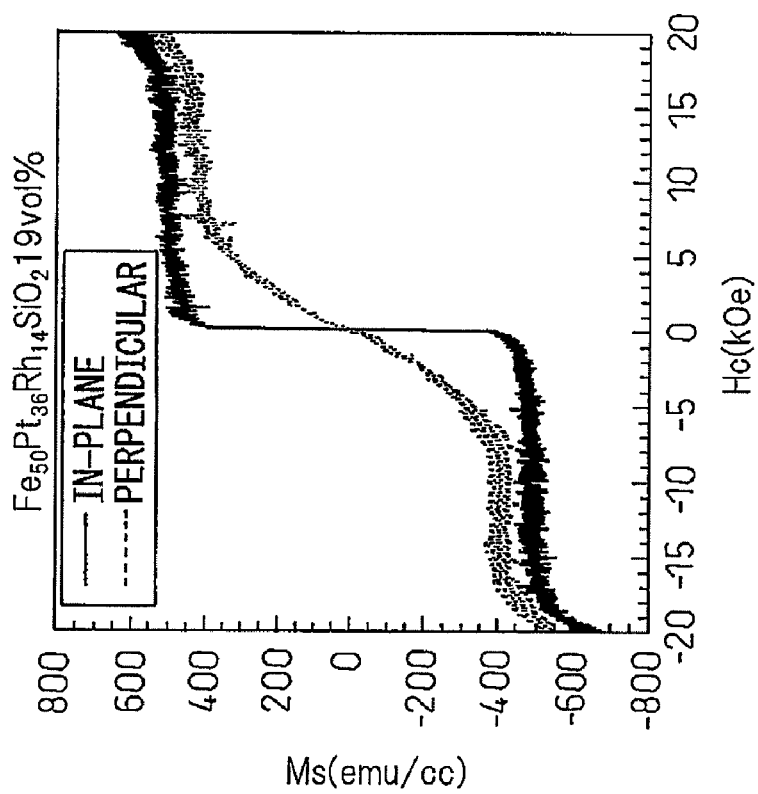

First, an $Fe_{50}(Pt_{1-x}Rh_x)_{50}$—$SiO_2$ (x=0.28) medium was formed as a film by sputtering on an $SiO_2$ substrate to a thickness of 10 nm and then subjected to a heat treatment at 700° C. over 1 hour. Sputtering conditions were as described above. FIG. 11A and FIG. 11B show hysteresis loops before heat treatment and after heat treatment, respectively. After the heat treatment, the medium exhibited a high coercive force of about 7 kOe and good perpendicular magnetic orientation and had magnetic characteristics required of a high-density perpendicular medium.

Figure 12B:
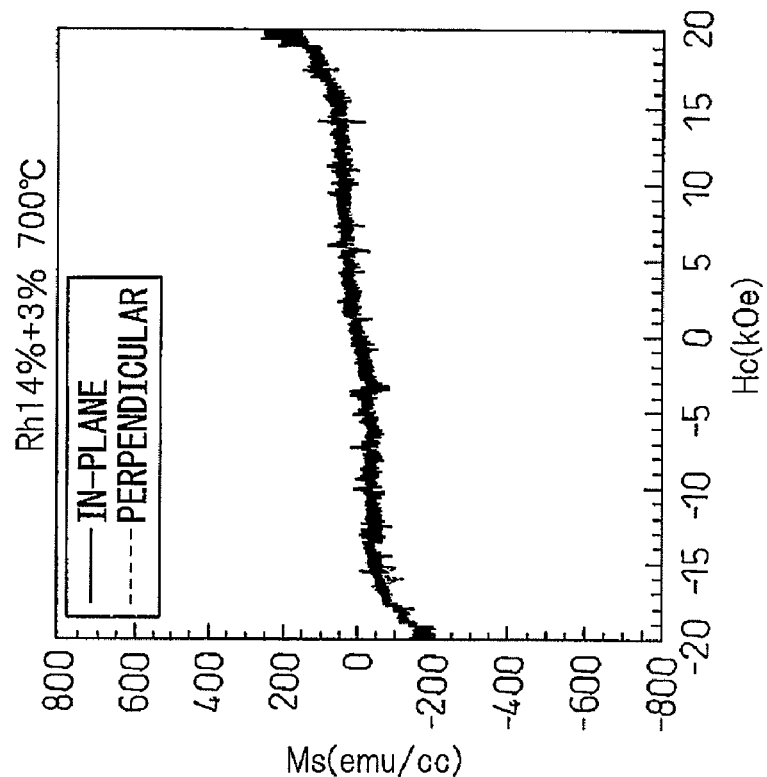
Figure 12A:
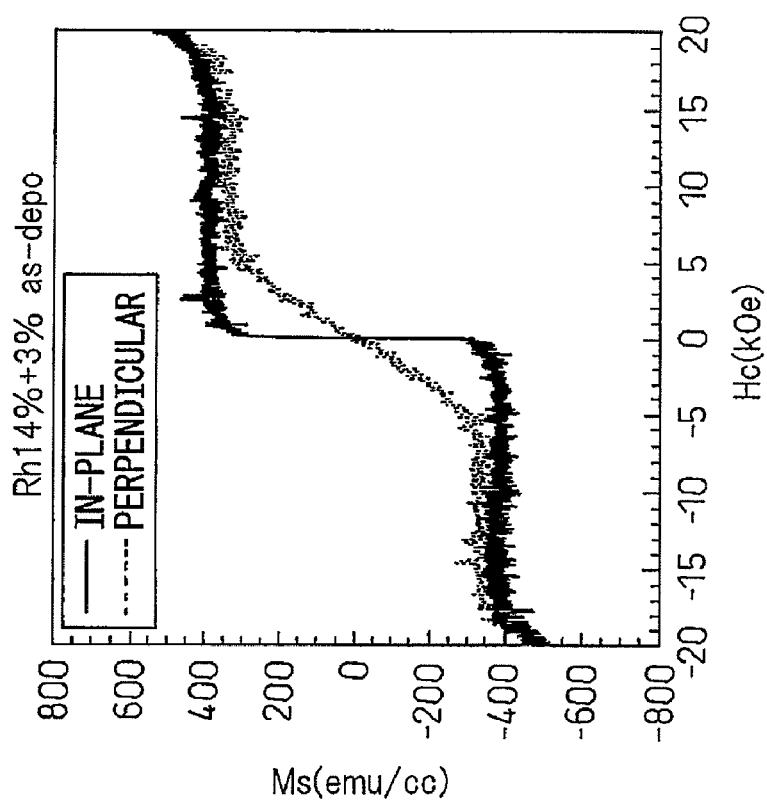

Next, in order to examine whether a nonmagnetic region (antiferromagnetic region) can be formed by diffusion of an additive element, after an $Fe_{50}(Pt_{1-x}Rh_x)_{50}$—$SiO_2$ (x=0.28) medium was formed as a film by sputtering on an $SiO_2$ substrate to a thickness of 10 nm, an Rh layer was film-formed thereon to a film thickness of 0.38 nm (this film thickness roughly corresponds to the thickness of a two-atom layer). This Rh layer was formed on the assumption that when Rh in the layer is diffused into the underlying $Fe_{50}(Pt_{1-x}Rh_x)_{50}$—$SiO_2$ (x=0.28) layer, x increases to about 0.34 and the region is transformed from ferromagnetism to antiferromagnetism. In this case, Rh is used as the additive and therefore, the ratio between Fe and $(Pt_{1-x}Rh_x)$ is slightly shifted from 50:50 but is in the range of forming an L1o structure. This stack film was subjected to a heat treatment at 700° C. over 1 hour. FIG. 12A and FIG. 12B show hysteresis loops before heat treatment and after heat treatment, respectively. The ferromagnetic soft magnetic property before heat treatment is changed into nonmagnetism in the detection accuracy of the measurement system and from the past analyses and interpretations, it may be most reasonable to consider that this region is transformed from ferromagnetism to an antiferromagnetic layer.

As understood from the above description, a patterned medium is formed by selectively forming Rh to a thickness of only a few atom layer in response to a pattern shape (in a discrete track medium, a gap partitioning a plurality of recording tracks; in a bit patterned medium, a gap partitioning a plurality of patterned ferromagnetic regions) corresponding to a patterned medium and then applying a heat treatment thereto. Also, in a recording/reproducing system on the assumption that the head floating amount is about 5 nm, the head disc interface would be scarcely affected by the formation of an Rh pattern to a thickness of only a few atom layer. Furthermore, as a matter of course, in the case of performing compositional modulation by an atomic diffusion method in place of ion implantation, it is also possible to select a composition allowing the initial medium to be antiferromagnetic and form a ferromagnetic region by partially applying the compositional modulation.

Figure 13:
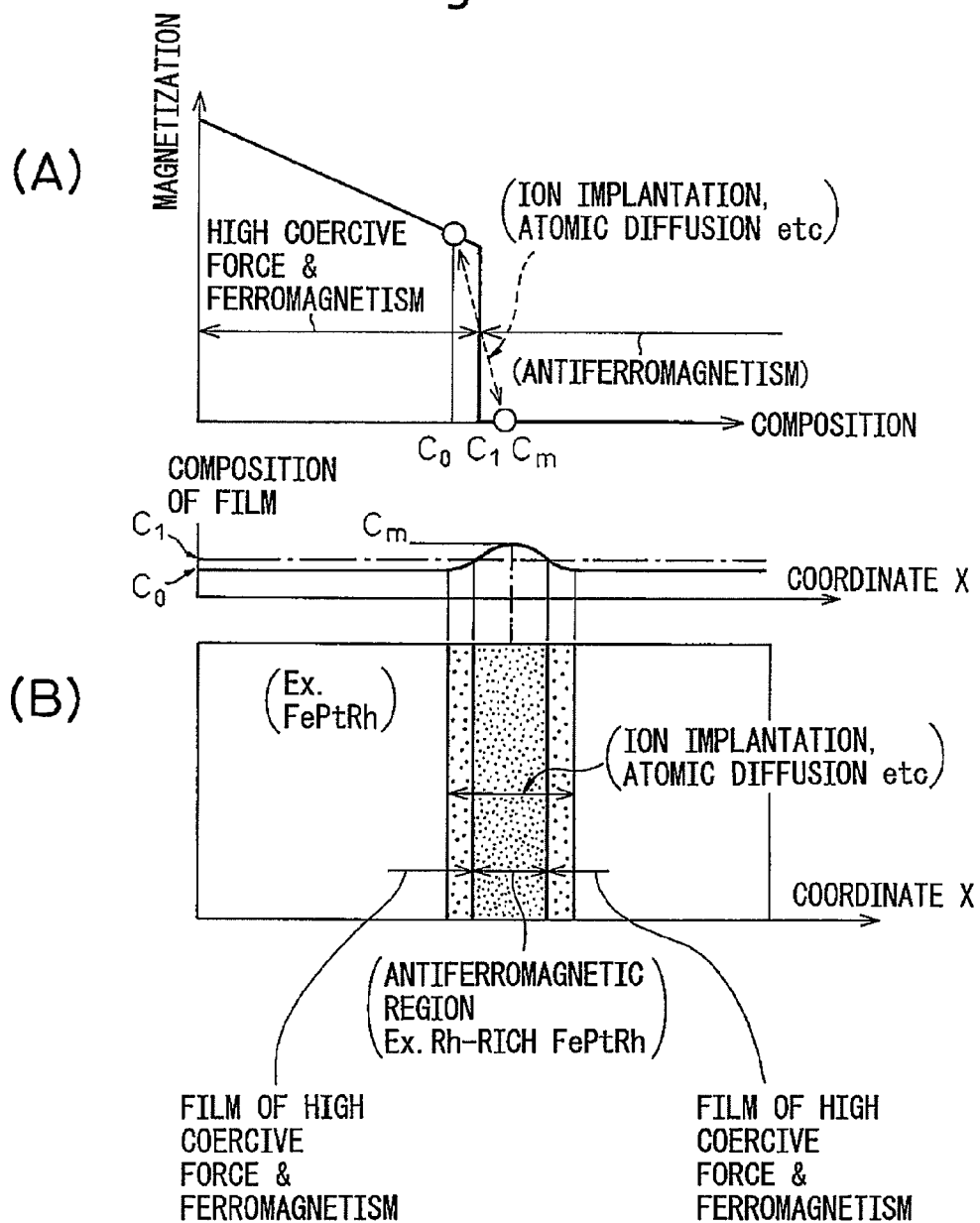

FIGS. 13A and 13B are a graph more clearly explaining the present invention described above. As shown in FIG. 13A, according to the present invention, a method such as ion implantation or atomic diffusion is employed and as a result of compositional modulation, the change from ferromagnetism to antiferromagnetism or the change from antiferromagnetism to ferromagnetism can be steeply induced. Furthermore, as a result of such a steep change, as shown in FIG. 13B, in the track-to-track or bit-to-bit separation region sandwiched by adjacent recording track regions, the boundary line with the recording track region can be made distinct and a good antiferromagnetic region can be realized, while ensuring a high coercive force in the recording track region formed of a ferromagnetic material.

Figure 14:
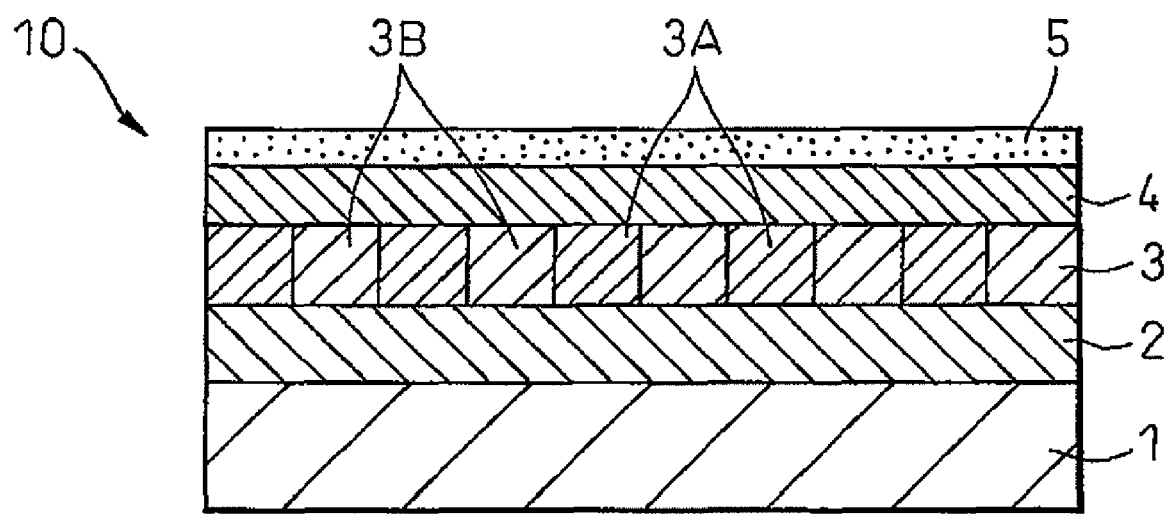
FIG. 14 is a cross-sectional view showing one embodiment of the magnetic disc according to the present invention.

FIG. 14 shows one embodiment of the magnetic recording medium of the present invention. For facilitating understanding of the invention, the medium shown, which is an example of a magnetic disc, is described by referring to a layer construction in a simple manner. It should be understood that in implementing the present invention, various actions and effects can be achieved in practice by employing a more complicated layer construction. For example, in addition to the film layers shown, an arbitrary film layer or intermediate layer can be added. The magnetic recording medium 10 shown has a nonmagnetic substrate 1, an underlying layer 2, a magnetic recording layer 3, a carbon protective layer 4, and a lubricant layer 5, but in the magnetic recording medium 10, various modifications and improvements may be performed within the scope of the present invention. For example, the magnetic recording layer 3 may be composed of multiple layers or an intermediate layer may be added. In fact, the layer construction of the actually-used magnetic recording medium is very complicated.

The nonmagnetic substrate may be formed from various materials commonly used in this technical field. Suitable examples of the nonmagnetic substrate include a crystalline glass substrate, a silicon substrate with a surface oxide film (for example, a silicon oxide film), an SiC substrate, a carbon substrate, and a ceramic substrate. The thickness of the substrate is usually from about 0.635 to 1.27 mm.

In the magnetic recording medium of the present invention, the magnetic recording layer of the medium is constructed by the present invention to contain a plurality of recording track regions extending in the circumferential direction, each composed of a plurality of continuous or isolated bits and formed of a ferromagnetic material, and a track-to-track separation region located between the recording track regions adjacent to each other and formed of an antiferromagnetic material. The thickness of the magnetic recording layer is usually from about 5 to 15 nm. For the details of the magnetic recording layer, the description above and below may be referred to.

The carbon protective film is a carbon protective film, a hydrogenated carbon protective film or the like and can be formed, for example, by a sputtering method, a plasma CVD method, an ion plating method or an FCA (filtered cathodic arc) method. Above all, in the case of an FCA method, when a high-hardness carbon protective film is deposited on the magnetic recording layer and nitrogen is incorporated into the high-hardness carbon protective film, adsorptivity of the carbon protective film for a liquid lubricant is remarkably enhanced and excellent durability can be obtained and maintained. The thickness of the carbon protective film is usually from about 3 to 10 nm.

Above the carbon protective film, a fluorocarbon resin-based lubricant layer is usually coated. The suitable lubricant is liquid and is easily available under the trade name such as Fomblin and Krytox. The thickness of the lubricant layer is usually from about 0.1 to 0.5 nm.

The present invention also provides a production method of the above-described recording medium of the present invention. According to the present invention, the magnetic recording medium of the present invention can be advantageously produced by using various means. In implementing the method of the present invention, a magnetic recording layer can be deposited on a nonmagnetic substrate through the following steps:

forming a film from a material for forming either one of the recording track region and the track-to-track separation region, to a predetermined thickness to form a precursor of a magnetic recording layer having the recording track region or track-to-track separation region; and modifying a predetermined region in the obtained precursor of a magnetic recording layer to form the recording track region or track-to-track separation region, thereby completing a magnetic recording layer.

FIGS. 15A to 15G sequentially show one preferred embodiment of the production method of a magnetic recording medium according to the present invention. It should be understood that the production method shown can be arbitrarily modified within the scope of the present invention.

Figure 15A:
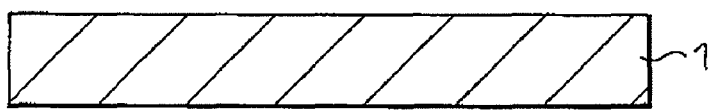
FIGS. 15A to 15G are cross-sectional views which sequentially show the production method of the magnetic disc illustrated in FIG. 14.
Figure 15B:
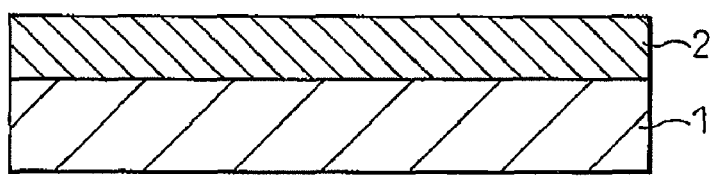

First, as shown in FIG. 15A, a nonmagnetic substrate 1 for use as a substrate of a magnetic recording medium is prepared. Next, as shown in FIG. 15B, an underlying layer 2 is deposited on the substrate 1. For example, an $SiO_2$ underlying layer 2 can be formed to a film thickness of 10 nm by an RF magnetron sputtering apparatus.

Figure 15C:
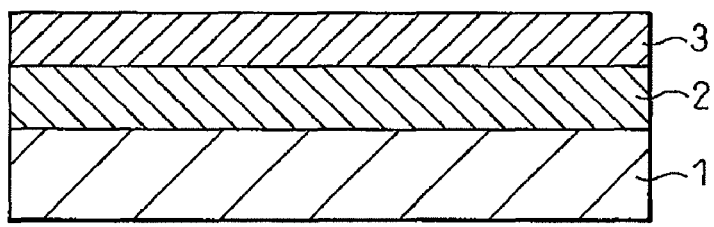

After the formation of the underlying layer is completed, a magnetic recording layer is formed according to the technique of the present invention. First, as shown in FIG. 15C, a material suitable for the formation of a track-to-track separation region is formed as a film on the underlying layer 2 by a sputtering method. For example, an $Fe_{50}(Pt_{1-x}Rh_x)_{50}$—$SiO_2$ (x=0.28) thin film 3 can be formed to a thickness of 10 nm. For the film formation, a sputtering method in a multi-cathode construction using Fe, Pt, an FeRh alloy and $SiO_2$ as targets can be employed.

Figure 15D:
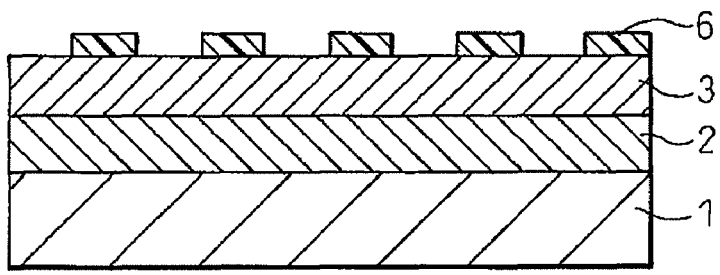

Thereafter, as shown in FIG. 15D, out of the surface of the $Fe_{50}(Pt_{1-x}Rh_x)_{50}$—$SiO_2$ thin film 3, the portion working out to a tack-to-track separation region (antiferromagnetic region) is selectively covered with a resist film 6. The thickness of the resist film is preferably from about 30 to 60 nm.

Figure 15E:
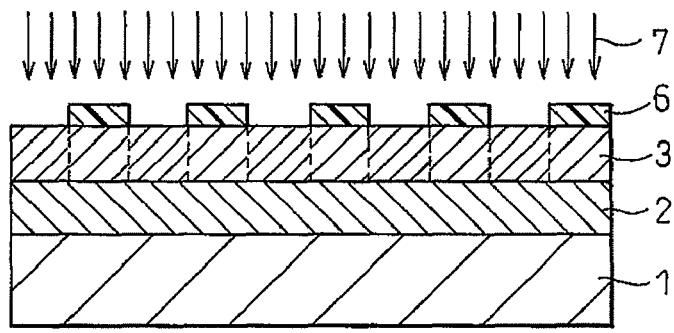

Subsequently, as shown in FIG. 15E, Rh ion 7 is implanted like arrows 7 in the $Fe_{50}(Pt_{1-x}Rh_x)_{50}$—$SiO_2$ thin film 3 where the recording track region is exposed, under the masking condition by the resist layer 6. The Rh ion implantation can be performed, for example, at a dose of $1.5 \times 10^{15}$ (ion/cm$^2$). It is considered that as a result of Rh ion implantation, in the region which should become a recording track region, x of the $Fe_{50}(Pt_{1-x}Rh_x)_{50}$—$SiO_2$ thin film 3 is changed from 0.28 to 0.32 and this region can satisfactorily lose the magnetism. In the above, a dose amount of $1.5 \times 10^{15}$ (ion/cm$^2$) is employed, but the dose amount can be arbitrarily changed according to the degree of compositional modulation or the like.

Figure 15F:
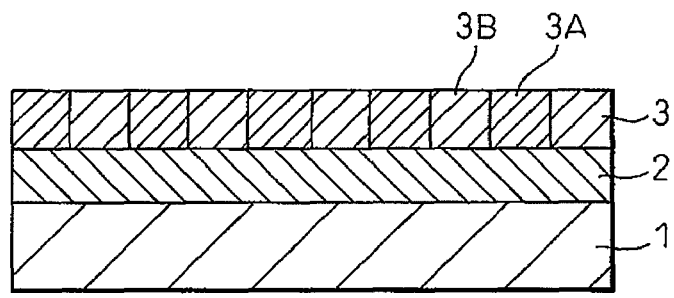
Figure 15G:
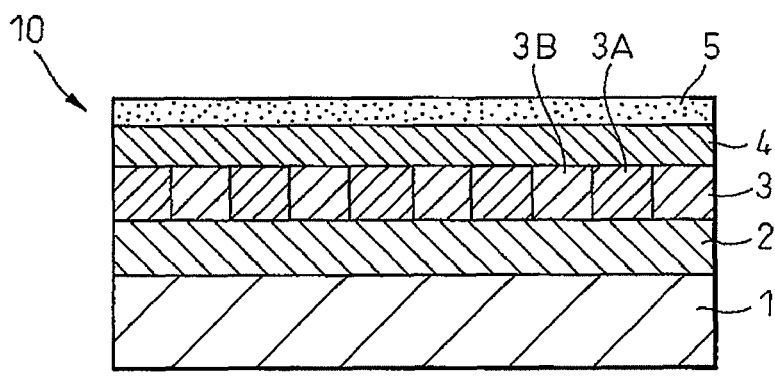

Furthermore, the $Fe_{50}(Pt_{1-x}Rh_x)_{50}$—$SiO_2$ thin film 3 after ion implantation is heat-treated (annealed) at 700° C. over 1 hour in an argon (Ar) atmosphere containing a slight amount of oxygen. By the heat treatment, as shown in FIG. 15F, the resist layer 6 used as the mask is removed and in the $Fe_{50}(Pt_{1-x}Rh_x)_{50}$—$SiO_2$ thin film 3, a track-to-track separation region 3A having implanted and diffused therein Rh and a recording track region 3B adjacent thereto are formed. The recording track region 3B still has high Hc and high Ms, but in the track-to-track separation region 3A, high Hc and high Ms are changed to Hc→0 and Ms→0. In the above, a heat treatment time of 1 hour at 700° C. is employed, but the heat treatment conditions can be arbitrary changed according to the degree of compositional modulation or the like. For example, the heat treatment may be performed at a temperature of about 600 to 800° C. over from about 5 minutes to about 2 hours.

After the magnetic recording layer 3 is formed according to the present invention, a carbon protective film 4 is deposited thereon. The carbon protective film 4 can be formed to a thickness of 5 nm, for example, by using a CVD film-forming apparatus. After the formation of the carbon protective film 4, a fluorocarbon resin-based lubricant layer 5 is coated thereon to a film thickness of 0.5 nm. Through such a series of treatments, a magnetic recording medium 10 having a layer construction shown in FIG. 15G can be produced.

In addition to the above-described magnetic recording medium and production method thereof, the present invention provides a magnetic disc apparatus having mounted therein the magnetic recording medium of the present invention. The magnetic disc apparatus of the present invention is not particularly limited in its structure but includes an apparatus fundamentally comprising a recording head part for recording information in the magnetic recording medium, and a reproducing head part for reproducing the information. The reproducing head part is preferably equipped with a magnetoresistive effect-type head using a magnetoresistive element causing the electrical resistance to change according to the intensity of the magnetic field, that is, an MR head, a GMR head, a TMR head or the like. In the magnetic recording medium of such a magnetic disc apparatus, the magnetic recording layer according to the present invention is incorporated and used.

Figure 16:
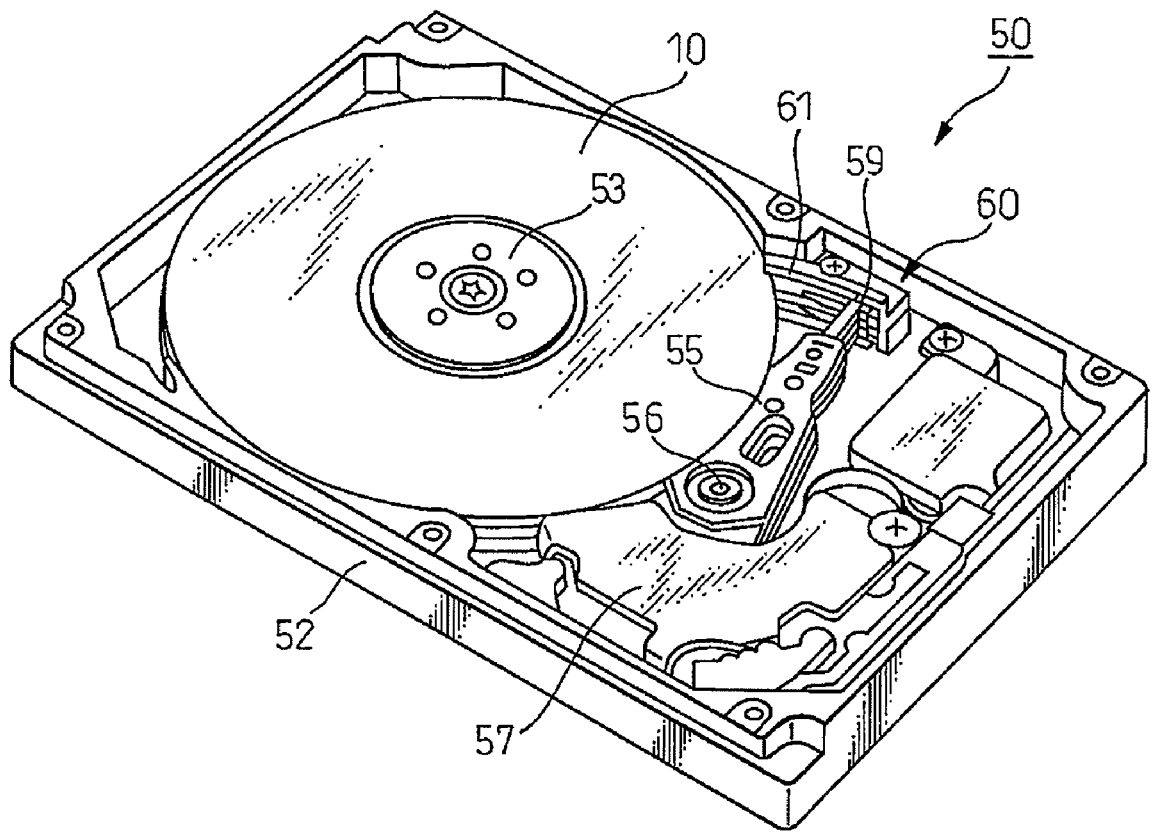
FIG. 16 is a respective view showing one embodiment of the magnetic disc apparatus according to the present invention.

FIG. 16 is a perspective view showing one preferred embodiment of the magnetic disc apparatus of the present invention. The magnetic disc apparatus shown is a currently used load/unload type hard disc apparatus, and the magnetic recording medium of the present invention can be mounted also in this hard disc apparatus. At least one magnetic disc (the magnetic recording medium of the present invention) 10 that is rotated by a spindle motor 53 is present as a memory medium on one side above a base 52 of the hard disc apparatus 50 and, as described above by referring to FIGS. 4A and 4B and FIGS. 5A and 5B, a large number of tacks for data recording are formed on the magnetic disc 10.

On another side above the base 52 of the hard disc apparatus 50, a swing arm 55 equipped with a head (not shown) that performs reading and writing of data by accessing the track of the magnetic disc 10 is provided. The head is fixed to the distal end of the swing arm 55. The swing arm 55 is constructed to swing around a rotation axis 56, and a voice coil motor 57 for driving the swing arm 55 is provided on the side opposite the swing arm 55 with respect to the rotation axis 56.

In the load/unload type hard disc apparatus 50, the head is retreated outside of the magnetic disc 10 at the unload time. To this end, in the load/unload type hard disc apparatus 50, a ramp mechanism 60 for holding the distal end of the swing arm 55 is provided on the base 52 in the vicinity of the outer periphery of the magnetic disc 10. The ramp mechanism 60 has a ramp 61 for holding a lift tab 59 provided at the tip part of the swing arm 55. The ramp mechanism 60 is provided outside of the magnetic disc 10, but a part of the ramp 61 is overlapped with the magnetic disc 10.

According to the present invention, as understood from the detailed description described above, a material made to cause no change in the crystal structure and undergo a sharp change in the physical properties from ferromagnetism to antiferromagnetism or from antiferromagnetism to ferromagnetism by adjusting the composition is used as the magnetic recording medium, or ion implantation or atomic diffusion is applied as the means for adjusting the composition, so that the boundary between the ferromagnetic region and the antiferromagnetic region can be narrowed as compared with conventional techniques and the recording density of the medium can be improved and adjusted. Also, according to the present invention, magnetic separation between magnetic bits can be definitely established.

In addition, the step of back filling the trough part, which is indispensable in the conventional dry process, can be omitted, so that the production cost and productivity can be improved. Furthermore, the compositional modulation can be performed by ion implantation or diffusion of additive element (atom) and at the same time, since the amount of the additive element necessary for the modulation of magnetic characteristics is small, deterioration of the surface property, which is incurred in the conventional methods, can be suppressed, as a result, the medium of the present invention can contribute to stable floating of a magnetic head in several nanometer order, which enables realizing high-density recording in a magnetic disc apparatus.

The invention claimed is:

1. A magnetic recording medium comprising a nonmagnetic substrate having deposited thereon a magnetic layer, wherein with respect to the in-plane direction, the magnetic recording layer comprises a plurality of ferromagnetic regions separated from each other by an antiferromagnetic region,
wherein the ferromagnetic material and the antiferromagnetic region have the same crystal structure.

2. The magnetic recording medium as claimed in claim 1, wherein the ferromagnetic region concentrically and continuously extends in the circumferential direction.

3. The magnetic recording medium as claimed in claim 1, wherein the ferromagnetic regions are concentrically disposed along the circumferential direction in a mutually divided state.

4. The magnetic recording medium as claimed claim 1, wherein the crystal structure is an L1o crystal structure.

5. The magnetic recording medium as claimed in claim 4, wherein the (001) axis of the L1o crystal structure is oriented perpendicularly to the formed base body to allow the medium to have perpendicular magnetic anisotropy attributable to the orientation.

6. The magnetic recording medium as claimed in claim 1, wherein the ferromagnetic region and the antiferromagnetic region each comprises an FePtRh alloy as the main component and are differing from each other in the composition of the FePtPh alloy.

7. The magnetic recording medium as claimed in claim 1, wherein the magnetic recording layer deposited on a nonmagnetic substrate contains a plurality of recording track regions extending in the circumferential direction, each composed of a plurality of continuous or isolated bits and formed of a ferromagnetic material, and a track-to-track separation region located between the recording track regions adjacent to each other and formed of an antiferromagnetic material.

8. The magnetic recording medium as claimed in claim 7, wherein the recording track region or track-to-track separation region is formed by, after a material for forming either one of the recording track region and the track-to-track separation region is formed as a film on the substrate to a predetermined identical thickness, modifying a predetermined region of the formed layer into the recording track region or track-to-track separation region.

9. The magnetic recording medium as claimed in claim 8, wherein the recording track region and the track-to-track separation region are formed by, after a ferromagnetic material for forming the recording track region is film-formed on the substrate to a predetermined identical thickness, protecting the recording track region out of the formed layer by the presence of a mask and modifying the exposed track-to-track separation region to cause a change into antiferromagnetism.

10. The magnetic recording medium as claimed in claim 9, wherein the modification treatment is ion plantation or atomic diffusion.

11. The magnetic recording medium as claimed in claim 7, wherein the recording track region and the track-to-track separation region each comprises an FePtRh alloy as the main component and differ from each other in the composition of the alloy, the FePtRh alloy is represented by the formula: $Fe_{50}(Pt_{1-x}Rh_x)_{50}$—$SiO_2$, and the composition is adjusted by the fluctuation of x in the formula.

12. The magnetic recording medium as claimed in claim 1, which contains an underlying layer, a magnetic layer, a carbon protective layer and a lubricant layer in this order on a nonmagnetic substrate.

13. A magnetic recording medium comprising a nonmagnetic substrate having deposited thereon a magnetic layer, wherein with respect to the in-plane direction, the magnetic recording layer comprises a plurality of ferromagnetic regions separated from each other by an antiferromagnetic region,
wherein the magnetic recording layer deposited on a nonmagnetic substrate contains a plurality of recording track regions extending in the circumferential direction, each composed of a plurality of continuous or isolated bits and formed of a ferromagnetic material, and a track-to-track separation region located between the recording track regions adjacent to each other and formed of an antiferromagnetic material, and
wherein the recording track region and the track-to-track separation region each comprises an FePtRh alloy as the main component and differ from each other in the composition of the alloy, the FePtRh alloy is represented by the formula: $Fe_{50}(Pt_{1-x}Rh_x)_{50}$—$SiO_2$, and the composition is adjusted by the fluctuation of x in the formula.

* * * * *